(12) United States Patent
Wyatt et al.

(10) Patent No.: US 12,124,862 B2
(45) Date of Patent: Oct. 22, 2024

(54) DYNAMIC COMMUNICATION SESSIONS WITHIN DATA SYSTEMS

(71) Applicant: State Farm Mutual Automobile Insurance Company, Bloomington, IL (US)

(72) Inventors: Amber Wyatt, Bloomington, IL (US); Hannah Matlock, Lexington, IL (US); Manuela Holt, Heyworth, IL (US); Joe Peebles, Bloomington, IL (US); Donald Joseph Yuhas, Bloomington, IL (US); Ginny Maxson, Bloomington, IL (US); Benjamin Shienvold, Roswell, GA (US); Whitney Street, Urbana, IL (US); Kathleen Haeker, Murphy, TX (US); Melissa Campbell, Chandler, AZ (US); Damon Webb, Bloomington, IL (US); Jason Beckman, Bloomington, IL (US); Joshua Robert Brown, Bloomington, IL (US); Ana Milicevic, Cumming, GA (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 17/838,908

(22) Filed: Jun. 13, 2022

(65) Prior Publication Data
US 2022/0398110 A1 Dec. 15, 2022

Related U.S. Application Data

(60) Provisional application No. 63/209,873, filed on Jun. 11, 2021.

(51) Int. Cl.
*G06F 9/451* (2018.01)
*G06F 3/0482* (2013.01)
(Continued)

(52) U.S. Cl.
CPC ............ *G06F 9/451* (2018.02); *G06F 3/0482* (2013.01); *G06F 16/2365* (2019.01); *G10L 15/26* (2013.01); *H04L 65/1069* (2013.01)

(58) Field of Classification Search
CPC .... G06F 9/451; G06F 16/2365; G06F 3/0482; G10L 15/26; H04L 65/1069
See application file for complete search history.

(56) References Cited

U.S. PATENT DOCUMENTS

| 9,760,839 | B1 * | 9/2017 | Lewis | G06Q 10/10 |
| 2004/0103010 | A1 * | 5/2004 | Wahlbin | G06Q 40/08 |
| | | | | 705/1.1 |

(Continued)

*Primary Examiner* — Mohammed H Zuberi
*Assistant Examiner* — Darrin Hope
(74) *Attorney, Agent, or Firm* — Lee & Hayes, P.C.

(57) ABSTRACT

Techniques described herein relate to analyzing data systems to detect data deficiencies and generating user interfaces for performing user communication sessions to resolve the data deficiencies. A data system may include components and implement operations to analyze a related set of data to determine when to initiate a communication session with a user to resolve a data deficiency. The data system also may be configured to generate user interfaces customized based on particular users and/or particular associates to allow the associate to interact with the user to resolve the data deficiency. The data system also may determine when to record the communication session, store and/or transcribe the communication session, and/or associate the stored communication session records with the corresponding data in the data system.

20 Claims, 12 Drawing Sheets

(51) Int. Cl.
  *G06F 16/23*   (2019.01)
  *G10L 15/26*   (2006.01)
  *H04L 65/1069* (2022.01)

(56) References Cited

U.S. PATENT DOCUMENTS

| | | | |
|---|---|---|---|
| 2007/0160190 A1* | 7/2007 | Blair | H04M 3/51 |
| | | | 379/265.04 |
| 2018/0192125 A1* | 7/2018 | Bolton | G10L 15/22 |
| 2018/0268305 A1* | 9/2018 | Dhondse | G06N 5/04 |

* cited by examiner

Claim Summary

Claim Number: NN-NNNNN-NNN
Date/Time of Loss: XXXXXXXX
Date Reported: XXXXXXXX
Status: Open

Policy Number: ABCD-EFGH-IJK
Tenure: NN months
Coverage in Force: XXXXXXXX

Recorded Comm Sessions

| Participant | Date | Transcription | Action |
|---|---|---|---|
| User 1 | 5/25/20 | Automated | Recall |
| User 1 | 5/29/20 | Pending | |
| User 2 | 5/29/20 | Professional | Recall |
| User 3 | 6/3/20 | None | |

Reports

| Name/Type | Date |
|---|---|
| Police Report | 6/17/20 |

Additional Participants

Payment History

Liability Details

File Notes

Recorded Communication

[ BEGIN RECORDING ] — 402

Introduction: ← 404

This is [ASSOCIATE NAME] and today's date is [CURRENT DATE AND TIME]. I am speaking [INTERVIEWEE NAME] concerning an event that occurred on [EVENT DATE AND TIME] at [LOCATION].

— 406

Verify Consent:

Mr. / Mrs. / Miss / Ms [INTERVIEWEE NAME], will you please state your full name?

First Name: [FIRST]   Last Name: [LAST]

Do you go by any other names (Aliases, AKA, maiden name?

First Name: [FIRST]   Last Name: [LAST]

Is this recording being made with your full knowledge and consent?   [ YES ] [ NO ]

Do I have your permission to proceed with this recorded statement?   [ YES ] [ NO ]

Call Closing:

Mr. / Mrs. / Miss / Ms [INTERVIEWEE NAME], do you wish to add anything?

Are these remarks your true version to the best of your knowledge?   [ YES ] [ NO ]

Has this recording been made with your full knowledge and consent?   [ YES ] [ NO ]

[ END RECORDING ] — 410

Interview Questions

∨ Participant Information

Street Address
1317 TRALEE LN

City   State
LOCKPORT  IL

Zip Code
60441-2678

Participant role
Claimant Driver ▼

Purpose of trip

| Personal | Employment | Ride Share | Mission |

Details of trip
returning home from grocery store

Working at time of loss?
Yes | No

Any passengers?
Yes | No

Do you carry other insurance or have any other vehicles?
Yes | No

Witnesses at scene?
Yes | No

Witness Information:
Info provided on police report

Loss Details

Date of Loss: 1/14/2021
Time of Loss: 6:30 PM

Loss Location Description
Intersection of main and elm

Can you please describe what occurred?
V2 was parked behind V1 at stop light. Light turned green and V2 rear ended V1.

806 — Injury Questions
Were you injured?
[Yes] [No]

Was anyone else injured?
[Yes] [No] [Unknown]

Vehicle
Is your vehicle drivable?
[Yes] [No]

Point of Impact/Vehicle Damage:

Bottom
- Tires
- Undercarriage
- Wheel/Rim

Driver Side
- Door Jammed - DS
- Door(s) DS
- Fender DS
- Quarter Panel DS

Front
- Engine
- Front Bumper
- Front Lamp(s) / Headlight(s)
- Glass - Windshield
- Hood

Passenger Side
- Door Jammed - PS
- Door(s) PS
- Fender PS
- Quarter Panel PS

Rear
- Deck Lid/Trunk
- Glass-Rear Window
- Rear Bumper
- Rear End
- Rear Lamp(s)/Tail Lamp(s)

Roof
- Rollover
- Roof
- Roof Buckled

Other
- Attached Trailer
- Engine Burn
- Exterior Burn
- Flood
- Glass - All Other
- Hail
- Interior
- Interior Burn
- Side Mirror(s)
- Total Burn
- Unknown
- Water Damage
- Other

FIG. 8D

DYNAMIC COMMUNICATION SESSIONS WITHIN DATA SYSTEMS

RELATED APPLICATIONS

This application claims priority to and is a non-provisional of U.S. Patent Application No. 63/209,873, filed Jun. 11, 2021, and entitled "DYNAMIC COMMUNICATION SESSIONS WITHIN DATA SYSTEMS," the disclosure of which is incorporated by reference herein in its entirety for all purposes.

TECHICAL FIELD

The present disclosure relates to software tools and techniques for performing data analysis, data integrity checking, and user interfaces. In particular, the present disclosure describes techniques for analyzing data within data systems to determine when user communication sessions are required to address data deficiency issues, and generating a customized user interface for performing a user communication session.

BACKGROUND

Large and complex data systems often require communication sessions with users in order to update the data, receive additional data, or address data deficiencies within the collections of data stored by the data systems. These large-scale data systems may store various complex data collections that include multiple data files or data stores, and incorporate data from many different data sources. Examples of such data systems include, for instance, insurance systems storing insurance policy and claim data, project data management systems, research or investigation data systems, and the like. Within such data systems, the data relating to a particular event or project may be stored in complex arrangements, including multiple copies of the same or similar data, data distributed across multiple storage locations, or data cross-referenced from different storage locations. Data systems also often may receive updates of the data from various users or other automated sources, and may execute automated processes on the data collections to perform data conversions, analyses, integrity checking, and the like.

When the data stored in a data system is deficient in one or more ways, a direct communication session with a user may be used to resolve the deficiencies. Examples of data deficiencies may include missing data fields that may be required within a data system, data fields that require a specific validation or affirmation by an associated user, and/or inconsistencies between two different corresponding data fields. As a non-limiting example of an insurance claim processing data system, when an accident or other event gives rise to an insurance claim, then the data deficiencies may include missing data fields needed to process the claim, a required recorded statement from one or more parties or witnesses, or inconsistencies between different data fields and/or user statements relating to the claim or event.

However, detecting and resolving data deficiencies with user communication sessions includes a number of technical challenges not addressed by conventional data systems. For instance, many conventional systems store data across multiple different files, databases, or other storage locations, each of which may be updated independently. Within such systems, it may be difficult or impossible for a user or software tool to detect deficiencies within the data. Further, conventional systems provide no solution to determine which users may be required to resolve specific data deficiencies, or which data deficiencies are acceptable and which must be resolved. Although conventional systems may permit various users or automated data sources to provide data into the data system, certain data inconsistencies and/or deficiencies may require resolution by specific users. To validate and document these resolutions, data systems may require recorded statements, transcriptions, and/or other targeted/recorded communication sessions with specific users designated to resolve specific data deficiencies. However, initiating user communication sessions via phone or video calls, capturing and storing recorded statements, and/or obtaining transcripts of statements, can be time consuming and costly, and performing these operations unnecessarily reduces the efficiency of the data both in processing time and in network and data storage requirements.

SUMMARY

To address these and other problems and inefficiencies, this disclosure describes systems and techniques for analyzing data systems to detect data deficiencies, and generating user interfaces for performing user communication sessions to resolve the data deficiencies. In various examples described herein, a data system may include components configured to analyze related sets of data to determine when to initiate a communication session with a user to resolve a data deficiency. The data system also may be configured to generate customized user interfaces based on particular users and/or particular associates that will allow the associate to interact with the user to resolve the data deficiency. Additionally, the data system may determine when to record the communication session, store and/or transcribe the communication session, and/or associate the stored communication session records with the corresponding data in the data system.

In an example of the present disclosure, a computer-implemented method includes receiving, by a computer system, event data associated with an event, and determining, by the computer system, one or more deficiencies in the event data. The method in this example also includes receiving, by the computer system, data indicating a first user associated with the event, and generating, by the computer system, a user interface associated with capturing recorded data related to the event, wherein generating the user interface is based at least in part on the first user and the one or more deficiencies in the event data. Additionally, the method in this example includes outputting, by the computer system, the user interface to a client device, receiving, by the computer system, input data via the user interface, and updating, by the computer system, the event data based at least in part on the input data.

In another example of the present disclosure, a computer system comprises one or more processors, and one or more non-transitory computer-readable media storing computer-executable instructions that, when executed by the one or more processors, cause the one or more processors to perform various operations. The operations in this example include receiving event data associated with an event, and determining one or more deficiencies in the event data, wherein the one or more deficiencies include at least one of an incomplete record or an inconsistent record. The operations in this example further include determining a first user associated with the event, and determining a set of input components, based at least in part on the one or more deficiencies in the event data, and the first user. Additionally, the operations in this example include generating a user interface including the set of input components, rendering the user interface via a client device, and receiving, via the set of input components, input response data from the client device.

Yet another example of the present disclosure includes one or more non-transitory computer-readable media storing instructions executable by a processor, wherein the instructions, when executed, cause the processor to perform various operations. The operations in this example include receiving event data associated with an event, and determining one or more deficiencies in the event data, wherein the one or more deficiencies include at least one of an incomplete record or an inconsistent record. The operations in this example also include determining a first user associated with the event, determining a set of input components, based at least in part on the one or more deficiencies in the event data, and the first user, and generating a user interface including the set of input components. Additionally, the operations in this example include rendering the user interface via a client device, and receiving, via the set of input components, input response data from the client device.

BRIEF DESCRIPTION OF THE DRAWINGS

FIG. 3 shows an example claim summary user interface screen, including a listing of recording communication sessions and reports, in accordance with one or more examples of the present disclosure.

FIGS. 4A and 4B show user interface screens and components of an example user interface associated with user communication session, in accordance with one or more examples of the present disclosure.

Figure 8C:
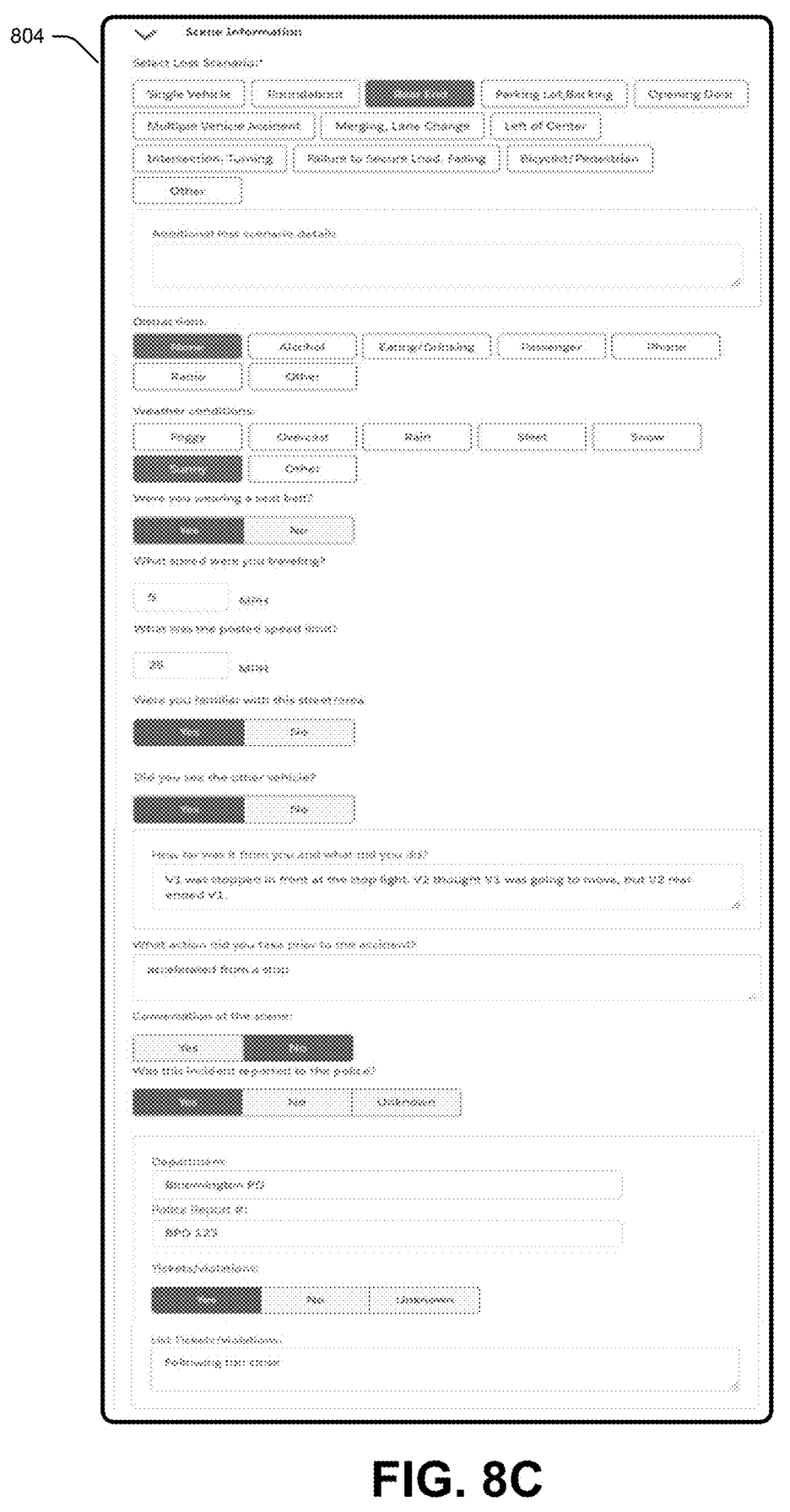

FIGS. 8A-8D show user interface screens and components of an example user interface associated with user communication session, in accordance with one or more examples of the present disclosure.

DETAILED DESCRIPTION

Figure 1:
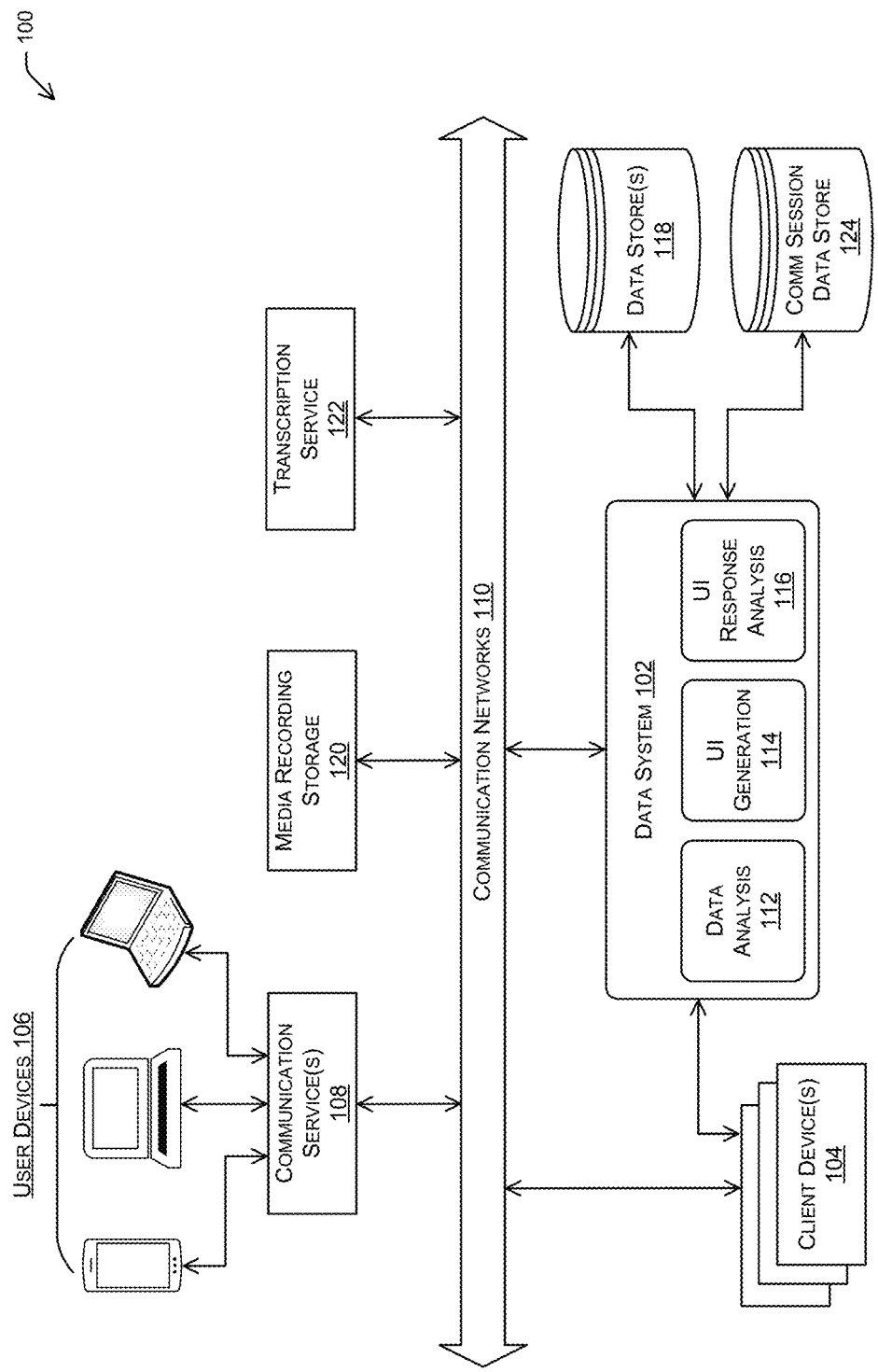
FIG. 1 illustrates a computing environment including a data system and configured to detect data deficiencies and provide user interfaces for communication sessions with users to resolve the data deficiencies, in accordance with one or more examples of the present disclosure.

FIG. 1 shows an example of a computing environment 100 including a data system 102 configured to detect deficiencies within related sets or collections of data, generate user interfaces for performing communication sessions with users to resolve the data deficiencies, and analyze responses received via the user interfaces to process the communication sessions and update the data sets or collections. As described in various examples herein, the data system 102 may generate and provide customized user interfaces to client devices 104. The client devices 104 may be used by associates (or other representatives) of the organization collecting and storing data related to one or more events, projects, etc., associated with the data system. The associates may use the customized user interfaces generated by the data system 102 during a call or other communication session with a customer (or other user) operating a user device 106. The communication sessions may include, for example telephone calls, web chat sessions, videoconferencing sessions, and the like, performed via communication service(s) 108 over one or more networks 110.

As described below, the customized user interfaces may be generated by the data system 102 based on data deficiencies detected within a set or collection of related data. The customized user interface may be used to initiate and/or control the communication session between the associate operating the client device 104 and user operating the user device 106, to address and resolve the data deficiencies. Additionally, the data system may analyze the input responses received via the user interface during the communication session, and may perform post-processing of the communication session, such as storing, transcribing, and/or associating the recorded communication session with the corresponding data updates in the data stores of the data system 102.

As these examples illustrate, the techniques described herein provide technical advantages and improvements in data systems, including improved processing operations within data system, improved data integrity, and improved user interfaces for updating data and resolving data deficiencies within data systems. For example, by detecting data deficiencies (e.g., missing data, inconsistent data, etc.) within a large data collection, and also by determining the particulars users associated with the data deficiencies, the techniques described herein allow the data deficiencies to be resolved more efficiently and more accurately by the user's best suited to address the data deficiencies. Additionally, the techniques described herein provide improved data integrity by detecting and resolving inconsistencies between different users (e.g., parties or witnesses to a dispute or investigation), and/or different data sources (e.g., automatically processed data or third-party reporting data), using recorded communication sessions to affirm and verify data from the appropriate users. The techniques also include trained models and/or heuristics-based algorithms to determine when and how a communication session (e.g., a recorded statement) is to be stored, transcribed, and/or associated with relevant data stored by the data system, thereby avoid unnecessary delays and costs associated with storing and transcribing communication sessions that do not optimally resolve the data deficiencies. Further, as described below these techniques also provide advantages of saving and optimizing screen space within user interfaces, and providing improved accuracy and efficiency in associate interactions with users, by generating user interfaces with response input controls that are based on the specific event-related data.

Data system 102 may be any computer system configured to store and/or analyze data for an organization. By way of example and not limitation, the data system 102 may be implemented as a claim processing system of an insurance provider, a project management system associated with a physical or software product development organization, an organization management software system, a data analytics system, etc. As noted above, the technical advantages of improvements of the techniques described herein may be especially pronounced for large-scale data systems 102, including data systems 102 that receive and store data from various different users, internal systems or third-party systems, as well as data systems 102 that receive frequent data updates and/or execute tools configured to analyze and revise the data internally. The data stored and managed by the data system 102 may include multiple different data files or other data stores of structured or unstructured data, including combinations of trusted and untrusted data from various different data sources, and data in various different types/formats to conform with different protocols, external and legacy systems, etc. In some cases, the data system 102 may store or manage data storage for one or more different events (or projects) associated with the organization, in which event includes data stored within multiple files, databases, etc. Examples of such events (or projects) may include, by way of example only and not limitation, insurance claims (for insurance providers), a project development process (for a project management system), analyses of sales/marketing effort (for an analytics system), etc. In such examples, the data related to the event may include set or collection data stored by the data system 102 relating to the particular event, including data stored internally or externally to the data system 102 across multiple clouds, datacenters, systems, files, databases, etc.

As shown in this example, the data system 102 includes a data analysis component 112, user interface generation component 114, and a user interface response analysis component 116. The data analysis component 112 may be configured to analyze the data stored by the data system 102, to detect deficiencies with the data that may be resolved by a user communication session, such as a phone call, video call, email, or web chat with a particular user associated with the data. As noted above, data deficiencies may include missing data fields within the data files/stores related to an event or project. Other examples of data deficiencies may include data inconsistencies, in which different fields of data within a set of event data that should be the same (or otherwise related) do not correspond in the prescribed manner. For instance, in an insurance claim data record, if one party indicates that an accident occurred on May $31^{st}$, and another party indicates that the accident occurred on June $1^{st}$, these statements are contradictory and may require resolution before the claim can be processed. In other examples, data deficiencies may include data stored by the data system that must be affirmed or validated by a specific user, such as recorded statements of parties and witnesses that may be properly attested to in-person, or by phone or video after the identity of the user and their consent to record the statement has been confirmed.

To detect data deficiencies, the data analysis component 112 may execute data integrity rules on one or more data store(s) 118 associated with the data system 102. Data store(s) 118 may sets and/or collections of data relating to events such as insurance claims, transactions, data projects or analyses, etc. In some cases, the data analysis component 112 may receive as input an identifier of an event (e.g., claim number, project identifier, etc.), and may analyze the data within the data store(s) 118 associated with the event. The data analysis component 112 may store on execute data integrity rules to detect, for example, data fields, files, or other data storage locations that are required but not yet populated (or are populated with invalid data). Additional data integrity rules may include rules associating specific data fields with other data fields, requiring that the data fields match or are otherwise compatible, and data integrity rules requiring validation from one or more users.

In some examples, the data integrity rules may be stored as metadata associated with individual storage locations (e.g., data fields, database columns, files, etc.) within the data store(s) 118. To apply the rules, the data analysis component 112 may identify the data associated with one or more events or users, retrieve the associated metadata, and determine the data integrity rules based on the metadata. The metadata may identify the associated data fields as required or optional, may specify content requirements, data type requirements, associations with other data fields in other files or databases, etc. In other examples, the data integrity rules need not be stored as metadata and may be stored as separate data integrity rules associated with a particular event, project, user, etc.

The rules used by the data analysis component 112 to detect data deficiencies also may be associated with specific users. For instance, a data field may be required to be input by and/or verified by one or more specific users (e.g., parties or witnesses associated with an event). Additionally, the rules applied by the data analysis component 112 may permit inconsistent or contradictory data between certain users and/or certain data sources (e.g., different witness accounts), but may require data consistency in other cases (e.g., matching incident dates on a police report and policyholder statement).

Additionally, the data integrity rules applied by the data analysis component 112 may be associated with a state (or status) of the event/project in some cases. In the context of analyzing insurance claim data, the data analysis component 112 may apply one set of data rules for a claim in a first state, and a different set of data rules for a claim in a second state, and so on. For instance, when the amount of claim damages are determined to exceed a threshold, or when a liability determination is completed for a particular party, or when the incident occurs in a particular state or region, etc., then the data rules executed by the data analysis component 112 may change based on these different claim states. For each different state or combination of states (e.g., claim type, liability type, damage amount, location, etc.), the data integrity rules may be different which respect to which data is required to process the claim, which data must be verified by which users, which data fields are associated with other data fields, etc.

When the data analysis component 112 detects one or more deficiencies in a related set or collection of data associated with an event/project, the data system 102 may use the user interface generation component 114 to generate a customized user interface for use by an associate of the organization. The customized user may be provided by the user interface generation component 114 to a client device 104 of an associate, and used by the associate during a communication session with a user (e.g., customer, party, witness, etc.). As described below in more detail, the customized user interface may include questions or prompts for the specific user, to allow the associate to address and resolve any deficiencies in the data associated with the user. For instance, when processing an insurance claim, the user interface generation component 114 may determine multiple data deficiencies associated with a single user (e.g., a claimant or other party). The multiple data deficiencies associated with the user may be based on data stored in various different files and/or by different internal systems of the organization (e.g., an account data deficiency, updated claim data, verification of a damage estimate data, etc.). In this example, the user interface generation component 114 may generate a user interface that combines multiple input components configured to prompt the associate to resolve each of the data deficiencies associated with the user. Additionally, any data deficiencies within the data system 102 that are associated with different users may be excluded from the user interface generated by the user interface generation component 114, so as not to prompt the user to provide data that should be provided by a different user. Therefore, by generating a single customized user interface based on the data deficiencies associated with a specific user, the user interface generation component 114 can allow the associate to more efficient resolve all of the data deficiencies associated that user across the various data files, stores, or systems, during a single communication session with the user.

In addition to generating the customized user interface for a communication session with a specific user, the user interface generation component 114 also may generate/customize user interfaces based on the associate operating the client device 106 and initiating the communication session. For instance, the customized user interface may include a customized call greeting, consent verification, and/or call closing that is based on the associate. In some cases, different classifications of associates may be trained or permitted to resolve different types of data deficiencies, and in such cases the user interface generation component 114 may include components to resolve only those data deficiencies for which the associate is trained or permitted to resolve. Additionally or alternatively, the user interface generation component 114 may further customize the user interface based on the locations of parties to the communication session (e.g., the locations of the client device 104 and user device 106), and/or based on the characteristics or state of the event/project (e.g., claim type, claim statues, etc.).

After the data system 102 provides the customized user interface to the client device 104, the associate (or representative) of the organization may use user interface to initiate a communication session with the user in order to resolve the data deficiencies associated with that user. In some examples, the communication session may be a voice call (e.g., telephony-based) session between the user (e.g., customer) and associate, which can be initiated by either party. Additionally or alternatively, the communication session may be a video call session, web chat session, email communication, social media-based chat session, etc. During the communication session, the client device 104 of the associate establishes a connection to one or more communication service(s) 108, via the network(s) 110, to the user device 106 operated by the user. The communication service(s) 108 may include, for example, a voice service, video service, messaging/chat service, and/or social media service configured to implement the functionality of providing interactive communication sessions between users and associates of the organization.

In some examples, the data system 102 may be implemented on one or more computer servers in a datacenter or cloud-based computing system of the organization. As shown in this example, the data system 102 and other the internal components of the organization (e.g., client devices 104, the data store(s) 118, etc.) may reside within a single server or datacenter, operating at one geographic location and/or in one secure network. In such cases, some or all of the data system 102 and other internal components of the organization may communicate via a secure private network such as a private LAN or secure corporate network protected by a firewall. In other implementations, the internal components of the organization may be distributed across multiple servers and/or multiple data centers that operate at different geographic locations. Internal components that are distributed across data centers may communicate via secure private networks and/or via unsecure public networks (e.g., the Internet) and may use tunneling and encryption technologies. Communication networks 110 may include, but are not limited to, computer networks (e.g., TCP/IP networks, etc.), wireless networks (e.g., Long-Term Evolution (LTE), 5G, a Universal Mobile Telecommunications Service (UMTS), Global System for Mobile communications (GSM) networks, etc.), satellite networks, and the like.

During a communication session between a user and an associate, the associate may use the customized user interface from the user interface generation component 114 to prompt the user to resolve the data deficiencies identified for that user by the data analysis component 112. The customized user interface may provide the associate with an outline or script to follow during the communication session with the user. As the user answers questions during the communication session, the associate may input data into the user interface based on the user's responses. As described in more detail below, the customized user interface may include questions directed to the specific inconsistencies and/or other data deficiencies associated with the user. In some cases, the customized user interface may prompt the associate to initiate a recorded communication session (e.g., recorded statement) of the user. In such cases, the customized user interface may include a consent verification, call closing, and/or user interface prompts or controls to begin and end the user's recorded session.

When the communication session ends, the user interface response analysis component 116 may store the responses input by the associate into the user interface during the session, and/or the media content (e.g., audio, video, web chat records) for any recorded statements made by the user during the session. For example, the user interface response analysis component 116 may format and convert data input by the associate, and store the data at the appropriate storage locations in the data store(s) 118 to resolve the data deficiencies. In some cases, the user interface response analysis component 116 may analyze the response input data received via the user interface to determine whether the user has provided sufficient responses, or whether the user has failed to answer certain questions, or has provided incorrect or improper responses, etc. When the user interface response analysis component 116 determines that the response input data was incorrect or insufficient, it may initiate one or more actions. Such actions may include determining that the response input data should (or should not) be stored in the data store(s) 118, determining that a recorded statement of the user should (or should not) be stored or transcribed based on the response input data, prompting the associate to continue the communication session (and/or recorded statement) or to initiate a new communication session with the same or a different user.

When the user provides a recorded statement during the communication session, the user interface response analysis component 116 may store the media content of the recorded statement (e.g., audio and/or video data) in a media recording storage system 120. The media recording storage system 120 may be implemented as an external storage service or an internal media storage system of the organization. In some examples, when the user interface response analysis component 116 determines that the user's responses were not sufficient to resolve the data deficiencies, it may determine that the user's recorded statement need not be stored in the media recording storage system 120. For instance, if the call/communication session is disconnected early, or the user cannot or does not provide the requested information to resolve the data deficiency, then the user interface response analysis component 116 may discard rather than store the media content of the recorded statement.

In some examples, the user interface response analysis component 116 also may determine whether or not to initiate a transcription of a user's recorded statement. The determination to initiate a transcription of a recorded statement may be based on the response input data provided by the associate with via the user interface. Depending on an analysis of the response input data, including determining what data the user provided during the recorded statement, and/or analyzing the user's specific responses to one or more questions, the user interface response analysis component 116 may initiate a transcript of the recorded statement. The user interface response analysis component 116 also may determine a type of the transcript to be generated (e.g., a software-based automated transcript versus a human-made manual transcript), based on the response input data received via the user interface, and then may provide the audio/video files for the recorded statement to a transcription service 122 to perform the transcription. In other examples, depending on the response input data, the user interface response analysis component 116 may determine that the recorded statement is not to be transcribed.

Based on the determinations by the user interface response analysis component 116 to store the response input data within the data store(s) 118, store a recorded statement, and/or transcribe the recorded statement, the user interface response analysis component 116 also may store data within a separate communication session data store 124. In some examples, the communication session data store 124 may be used to store associations between specific data storage locations (e.g., files, databases, or data fields within the data store(s) 118), associated recorded statements in the media recording storage system 120 (e.g., recorded statement name and path, timestamps of responses, etc.), and/or associated transcripts of the recorded statements (e.g., transcript name and path, page/line numbers, etc.). Accordingly, the communication session data store 124 may include data linking specific data within the data store(s) 118 to associated user recorded statements and/or transcripts, so that the supporting data can be easily retrieved and verified when needed.

Figure 2:
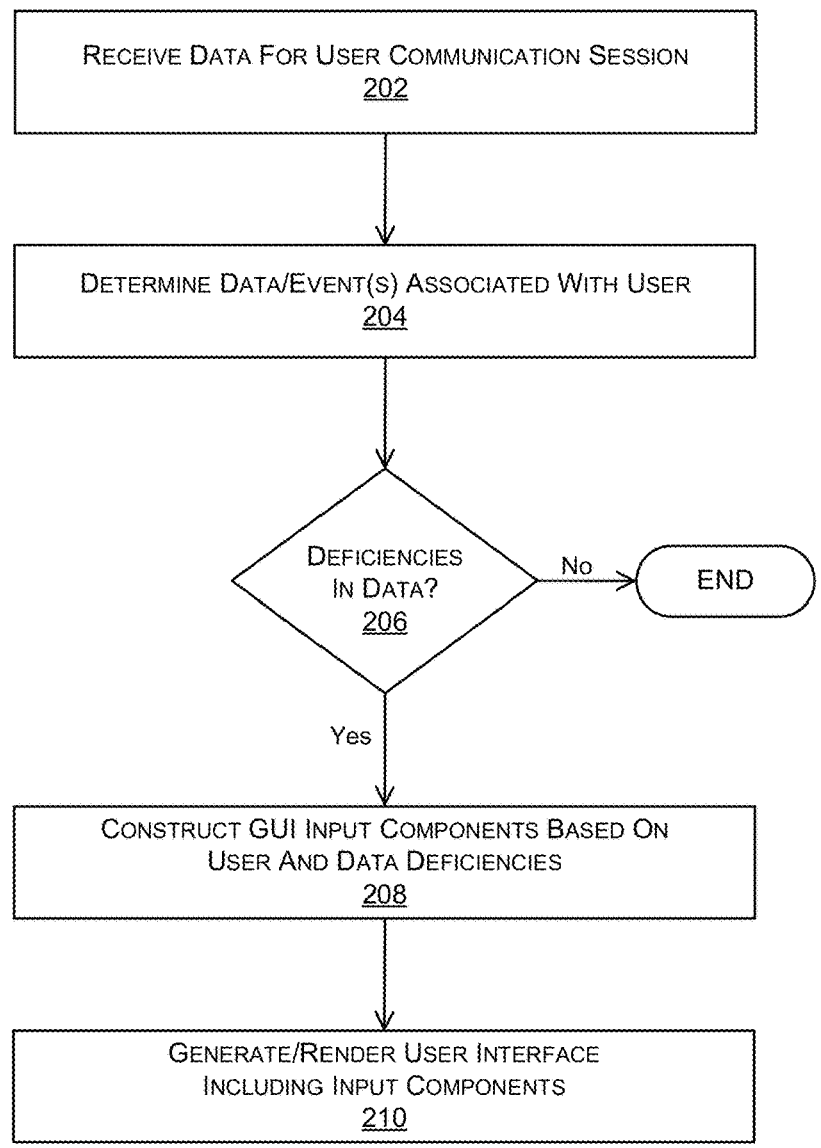
FIG. 2 illustrates an example process of generating and rendering a customized user interface based on determined data deficiencies associated with a user communication session, in accordance with one or more examples of the present disclosure.

FIG. 2 is a flow diagram illustrating a process 200 for generating a customized user interface based on the data deficiencies associated with a particular user in a data system. As described below, process 200 may relate to scenarios in which an existing communication session is occurring between a user and an associate of an organization. As the existing communication session is occurring, the data system 102 analyzes the data deficiencies associated with the particular user, and then generates a customized user interface to allow the associate to resolve the data deficiencies and/or capture a recorded statement from the user. Thus, the techniques illustrated in process 200 provide more efficient customer management and/or data processing strategies, by reducing the overall number of communication sessions that are needed to obtain the required data from the user, and reducing the latency in obtaining the data to improve data analytics and processing speeds.

At operation 202, the data system 102 may receive data identifying a user communication session occurring between a user and an associate. In some examples, the client device 104 of the associate may communicate with the data system 102, to indicate that a phone call, video call, web chat session, or the like, has been initiated between the user and the associate. The data system 102 and/or communication service(s) 108 may be integrated within an automated contact center in some cases, which may receive and route incoming calls to available associates at the client devices 104. In such cases, contact center software executing on the client device 104, the communication service(s) 108, or elsewhere in the computing infrastructure of the organization may transmit a notification to the data system 102 when a call (or other communication session) is connected between a user and an associate. The user may initiate the calls to the associate (e.g., via a contact center portal or gateway), or vice versa (e.g., via a direct call from the associate to the user). When a call or other communication is initiated between the associate and the user, the data system 102 may receive information identifying the user, the associate, the claims/issues associated with the communication session, etc.

At operation 204, when the data system 102 has determined that a user communication session is occurring between a user and an associate, the data analysis component 112 may determine one or more event(s) and data associated with the user. As discussed above, the data system 102 may be associated with an organization storing large amounts of complex data that may relate to multiple different events or projects. As a non-limiting example, an event may correspond to an insurance claim, law enforcement report or investigation, research project, commercial transaction, customer service ticket/issue, etc. For each such event, the data store(s) 118 may store a collection of data in various different forms (e.g., data files, structured data, databases, media content, etc.), which may be received from various different individuals or data sources. In operation 204, the data system 102 may determine the event(s) (or projects, data collections, etc.) with which the user is associated, and the individual data files or fields within the events relating to the user. For instance, for a data system 102 associated with an insurance claim processing system, in operation 204 the data system 102 may determine which of the currently open claims and which of the portions of the data for those claims are associated with the user. To illustrate, if a user that called in to speak with an associate (or was called by the associate) is the claimant for one open claim and a third-party witness in an unrelated open claim, then in operation 204 the data analysis component 112 may identify the data sets for these open claims and determine the specific data (e.g., data stores, files, data fields, etc.) in each claim that is associated with the user.

At operation 206, the data analysis component 112 analyzes the data within the data store(s) 118 associated with the user, to determine whether the data includes any deficiencies that can be resolved during the current communication session with the user. As noted above, data deficiencies may include missing data fields, missing user affirmations or verifications of user statements (e.g., recorded statements), and/or inconsistent or contradictory data. The data analysis component 112 may identify data deficiencies using rules associated with the events/projects, and/or metadata associated with particular data files or fields. When the data analysis component 112 identifies no data deficiencies within the associated data sets/collections for the user's event(s), or when the identified data deficiencies are associated with other users than the current user, then the data system 102 may terminate the process (206:No). In these cases, the termination of the process may reflect the determination by the data analysis component 112 that the current use cannot resolve any data deficiencies within the data store(s) 118.

When the data system 102 identifies one or more data deficiencies associated with the user (206:Yes), then at operation 208 the user interface generation component 114 determines and constructs user interface components based on the data deficiencies associated with the user. As an example, when the data analysis component 112 detects a missing data field/item associated with the user, the user interface generation component 114 may generate a user interface component with a question and response field to receive the missing data. Similarly, when the data analysis component 112 determines that the user has provided inconsistent data in previous communications, the user interface generation component 114 may generate a user interface component with a question and response field to resolve the inconsistency.

The user interface generation component 114 may generate questions with text boxes to receive responses from the associate, or in multiple choice form in which the associate may click or otherwise select from the multiple-choice answers provided on the user interface. In some examples, the possible responses for multiple-choice answers can be generated on-the-fly by the user interface generation component 114, based on data within the data store(s) 118. For instance, if a data deficiency is an inconsistency between two previously received data fields/items relating to the event, then the user interface generation component 114 may use the previously received data fields/items as multiple choice answers to allow the user to resolve the inconsistency. As another example, the multiple-choice answers for a question by the user interface generation component 114 may correspond to listing of related data items, such as names (e.g., party names, witness names, project names, etc.), accounts, vehicles, or other listings items within the associated event/project data in the data store(s) 118.

The user interface components constructed in operation 208 also may include components relating to capturing a recorded audio and/or video statement from the user during the communication session. These components may include programmatic UI components configured to begin, end, and pause an audio/video recording of the user communication session, as well as consent verifications, opening/closing remarks or questions to be included in the recorded statement.

At operation 210, the data system 102 may generate the user interface including the set(s) of individual UI components generated in operation 208, and then provide the user interface for rendering on the client device 104 to be used by the associate during the communication session. As described below in more detail, the user interface provided to and rendered on the client device 104 may include a combination of prompts for the associate, questions for the associate to ask the user during call, input components for the associate to document the user's responses, and/or various other customized user interface components.

As discussed above, the components that are constructed and rendered in the customized user interface for the associate may be based on the specific user currently communicating with that associate. These components may be constructed to allow the associate to address any data deficiencies that potentially can be resolved by the user. Additionally, in some examples the components within the customized user interface may be based on the specific associate on the call, the locations of the client device 104 and/or user device 106, the type or current state of the user-related data (e.g., a current claim state, project state, etc.). For instance, the requirements of recorded statements may vary in some cases for different events/claims/projects, different geographic regions of the user or associate, etc. Accordingly, the user interface generation component 114 may generate and/or customize any of the components in the user interface based on one or more attributes of the associate and/or user (e.g., location, seniority experience, spoken/written language, etc.), the locations of the client/user devices, current states of data (e.g., claim status, project statues, etc.).

FIG. 3 shows an example screen for an insurance claim summary user interface 300. The user interface 300 may be provided to a claims associate or other representative of the organization, to allow the associate to review and modify data relating to the claim. As shown in this example, multiple different user recorded statements may be captured in association with the claim, and the user interface 300 includes a section 302 to identify the existing recorded statements and status thereof. Additionally, the user interface 300 includes a reports section 304 that indicates which third-party reports (e.g., police reports, medical reports, vehicle damage reports, etc.) have been received in connection with the claim.

As the user interface 300 illustrates for insurance claims, a single claim may be associated with multiple different users (e.g., claimants, parties, witnesses, service providers, etc.), and may receive data/information from multiple different data sources. Additionally, a single user may be associated with multiple different claims, and within each claim the user may be associated with general claim data or a particular subset of user-specific data. Accordingly, a customized user interface generated for a particular user may include a set of UI components associated with a single claim or multiple different claims. Further, the customized user interface may exclude questions or components related to data deficiencies of a claim, if those data deficiencies are not associated with the particular user but with other users associated with the same claim. Although this example shown in FIG. 3 relates to insurance claims, it can be understood from the context of this disclosure that similar or identical techniques for detecting data deficiencies and generating customized user-specific user interfaces can be applied to other types of data (e.g., data collections, events, data projects, etc.).

FIGS. 4A and 4B depict two examples of screens in a user interface configured to allow an associate to capture a recorded statement during a communication session with a user. In this example, the data analysis component 112 may determine a recorded statement from the user is required to affirm or verify certain data relating to an event (e.g., claim, project, accident, investigation, or transaction, etc.). In this example, user interface screen 400 includes a button 402 to begin recording the user statement. The user interface screen 400 also includes an introduction component 404 with introduction text, and a consent verification component 406 with user interface prompts and controls that the associate can use to verify the user's consent to the recorded statement. FIG. 4B shows an example call closing component 408 that includes an end recording button 410. In these examples, the text and UI controls in the introduction component 404, the consent verification component 406, and/or the call closing component 408 may be customized based on various user-specific and/or event-specific information. For instance, these text sections and/or UI controls may be customized based on user data (e.g., the user's name, account details, previous statements, etc.), associate data (e.g., the associate's name, title, company, etc.), the current time and date, and/or event data (e.g., a time, date, and location of the event), etc. In some examples, the begin recording button 402 and end recording button 410 (and/or a pause recording button, not shown) may activate software-based audio/video recording functionality embedded into a browser or client application executing on the client device 104.

Figure 5:
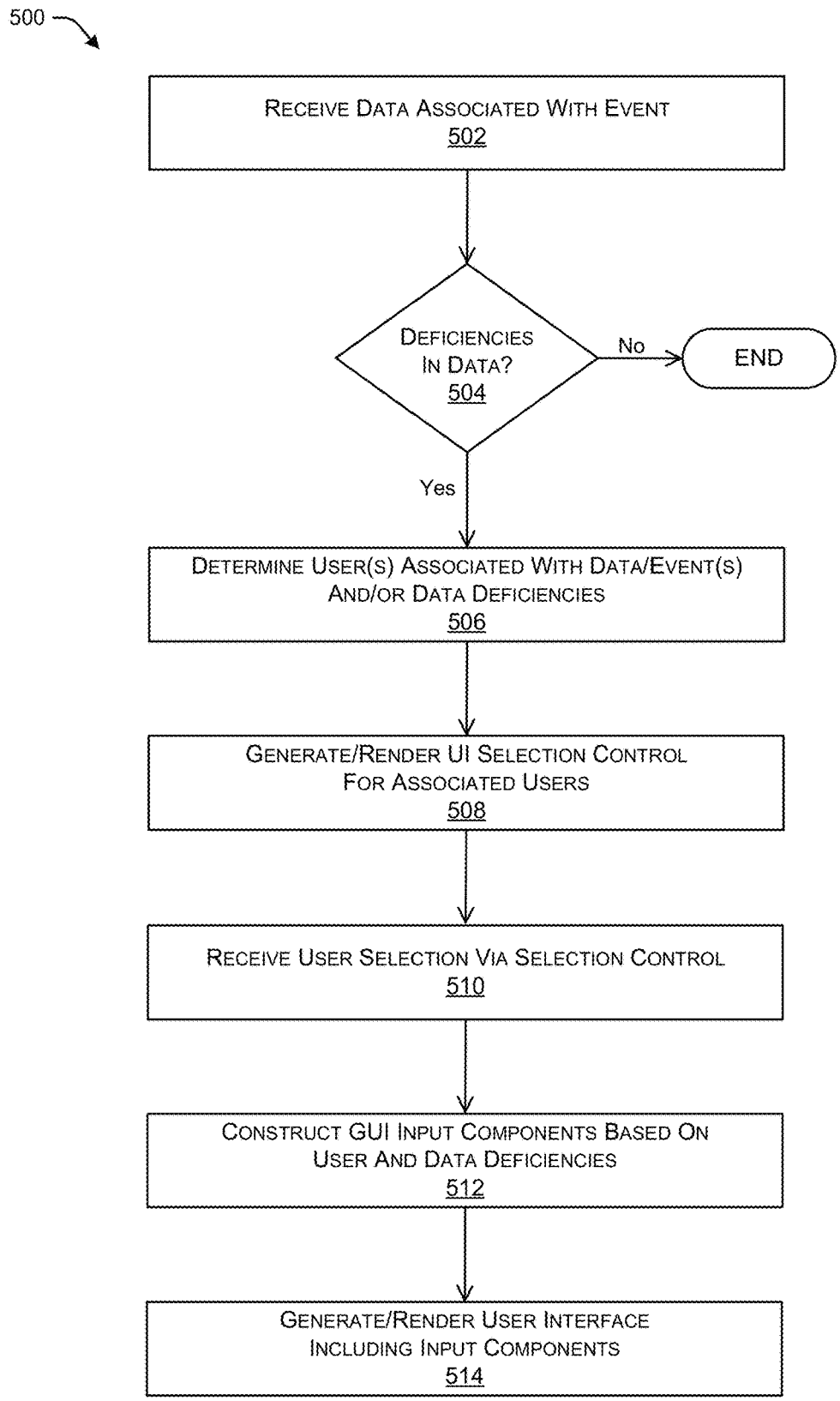
FIG. 5 illustrates another example process of generating and rendering a customized user interface based on determined data deficiencies associated with a data system, in accordance with one or more examples of the present disclosure.

FIG. 5 is a flow diagram illustrating another process 500 for generating a customized user interface based on data deficiencies detected in a data system. As described below, process 500 may relate to scenarios in which the data system 102 analyzes data relating to an event, project, or other set of related data to identify one or more data deficiencies. A single event may have various associated data stored in the data store(s) 118, and the event data may be associated with different users. For instance, an insurance claim may have multiple data fields in data stores, data files, and/or media content associated with the different parties related to the accident and/or the claim. In various examples, process 500 may be executed periodically on the collection of data relating to an event, and/or may be executed in response to any process that adds new data or modifies the existing data associated with the event. As described below, the techniques illustrated in process 500 provide improved detection and resolution of data deficiencies in computing systems, by analyzing a related set of events, selecting a particular user associated with the event, and generating a customized user interface to resolve data deficiencies associated with the particular user.

At operation 502, the data system 102 receives data associated with an event. As noted above, non-limiting examples of events with related sets/collections of data may include insurance claims, law enforcement reports or investigations, research, product development projects, commercial transactions, customer service tickets/issues, etc. In some examples, the data analysis component 112 may retrieve the data associated with an event from the data store(s) 118, which may include various files, structured data, databases, and/or media content related to the event. Data also may be received from additional data sources, such as third-party systems or services providing various data records, transcripts, media content, and/or reports related to the events. In the context of insurance claims, data from third-party systems or services may include police reports, vehicle damage estimates, medical records from medical service provides, traffic camera data, third-party witness statements, etc.

At operation 504, the data system 102 executes data integrity rules to detect deficiencies within the data associated with the event. As discussed above, data deficiencies may include missing data fields, missing user affirmations or verifications of user statements (e.g., recorded statements), and/or inconsistent or contradictory data within the event data. The data analysis component 112 may identify data deficiencies using rules associated with the event/project, and/or using metadata associated with particular data files or fields. When the data analysis component 112 identifies no data deficiencies within the associated data sets/collections for the event, then the data system 102 may terminate the process (504:No).

When the data analysis system 112 identifies one or more data deficiencies within the data associated with the event(s) (504:Yes), then at operation 506 the data system 102 determines a set of users associated with the event. The set of users determined in operation 506 may include users associated with the event, or may include a particular subset of users associated with the data deficiencies detected in operation 504. As noted above, a single event may be associated with different users having different roles, each of which may provide different types of event-related data to the system. In the context of an insurance claim, for example, different users may include the claimant, other injured parties present at an accident, a liable party, several witnesses, a police investigator, a repair shop/salvage yard, medical services providers, etc. Each different user may provide different data, reports, recorded statements, etc.

At operation 508, the data system 102 generates and renders (e.g., causes an electronic device or display to render) a user interface selection control including a listing of the users associated with the event determined in operation 506. In some examples, the selection control may be generated by the user interface generation component 114, and rendered on a screen of an event summary (e.g., claim summary) user interface or any other user interface described herein.

Figure 6:
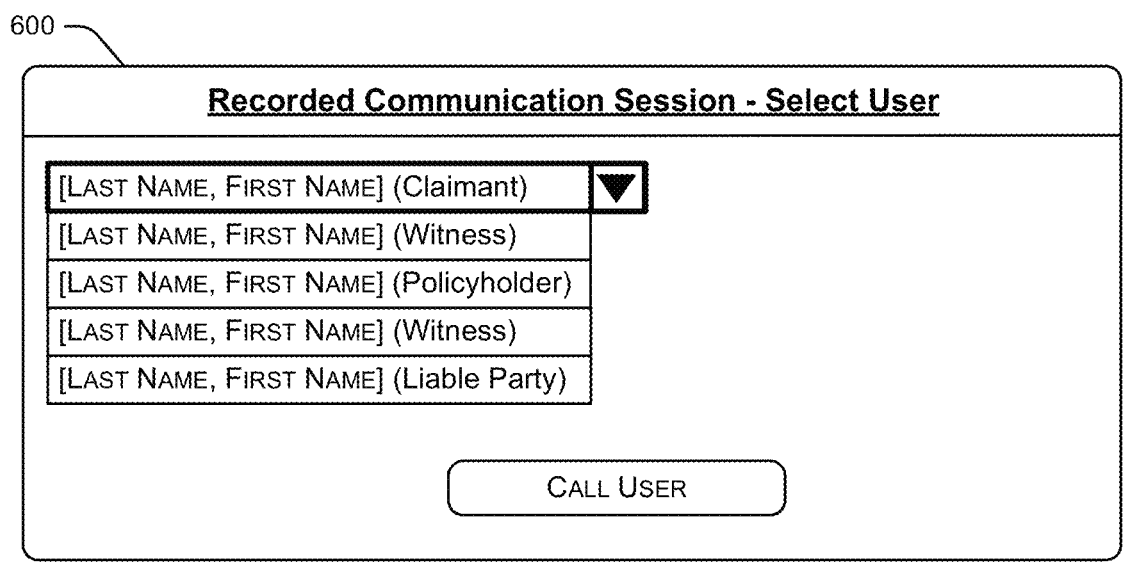
FIG. 6 shows a user interface screen and example user selection component associated with user communication session, in accordance with one or more examples of the present disclosure.

Referring briefly to FIG. 6, user interface screen 600 includes a selection control generated by the user interface generation component 114. In this example, the selection control is a drop-down menu populated with a listing of the users associated with an insurance claim. The user interface screen 600 may be provided to the associate and rendered on the client device 104, allowing the associate to select a particular user from the drop-down menu. Although the user interface screen 600 in this example displays the names and roles of the user with respect to the claim, in other cases the user interface may include additional information related to the data deficiencies associated with each user particular user. For instance, the user interface screen 600 may display, for each user in the drop-down menu, a summary of what data and/or recorded statement(s) are needed from the user, how much data is needed and an estimate of how long a call with the user would take, and/or what additional material (if any) would need to be accessed or reviewed by the associate before initiating a call with the user (e.g., police reports, other witness statements, etc.).

At operation 510, the data system 102 receives a user selection from the associate via the selection control. For example, the associate may select a particular user from the drop-down menu in user interface screen 600. The selection of the user by the associate may indicate that the associate has received a call from the user, or that the associate has called the user or is planning to call the user. Accordingly, in response to the user selecting the user via the via the selection control in operation 510, the data system may proceed to determine any data deficiencies specifically associated with the selected user, and may generate and render a user interface to allow the associate to resolve the data deficiencies during a call or other communication session with the user.

At operation 512, the user interface generation component 114 may determine and construct user interface components based on the data deficiencies associated with the user selected in operation 510. Operation 512 may be similar or identical to operation 208 described above. For example, the data analysis component 112 may detect one or more missing data fields/items associated with the selected user, and the user interface generation component 114 may generate user interface components with questions and/or response fields to receive the missing data. Similarly, when the data analysis component 112 determines that the selected user has provided inconsistent data in previous communications or that the selected user can resolve an inconsistency in other event-related data, the user interface generation component 114 may generate a component with a question/response field to resolve the inconsistency.

At operation 514, the data system 102 may generate the user interface including the set(s) of individual UI components generated in operation 510, and then provide the user interface for rendering on the client device 104 to be used by the associate during a communication session. The user interface provided to and rendered on the client device 104 may include a combination of prompts for the associate, questions for the associate to ask the user during call, input components for the associate to document the user's responses, and/or various other customized user interface components.

As noted above, the technical improvements described herein may provide advantages for detecting and resolving data deficiencies for systems in which multiple users relate to a single event and/or single collection of data in the system. The techniques illustrated in FIGS. 5 and 6 provide advantages in such systems, by selecting a particular user associated with one or more data deficiencies that might not apply to other users, and generating a customized user interface to allow the particular user to resolve the data deficiencies. These improvements may provide additional advantages for data systems 102 that receive and store from multiple systems/data sources, and data systems 102 that frequently receive data updates or execute analytics/updating tools to revise the data, which may generate additional data deficiencies.

Figure 7:
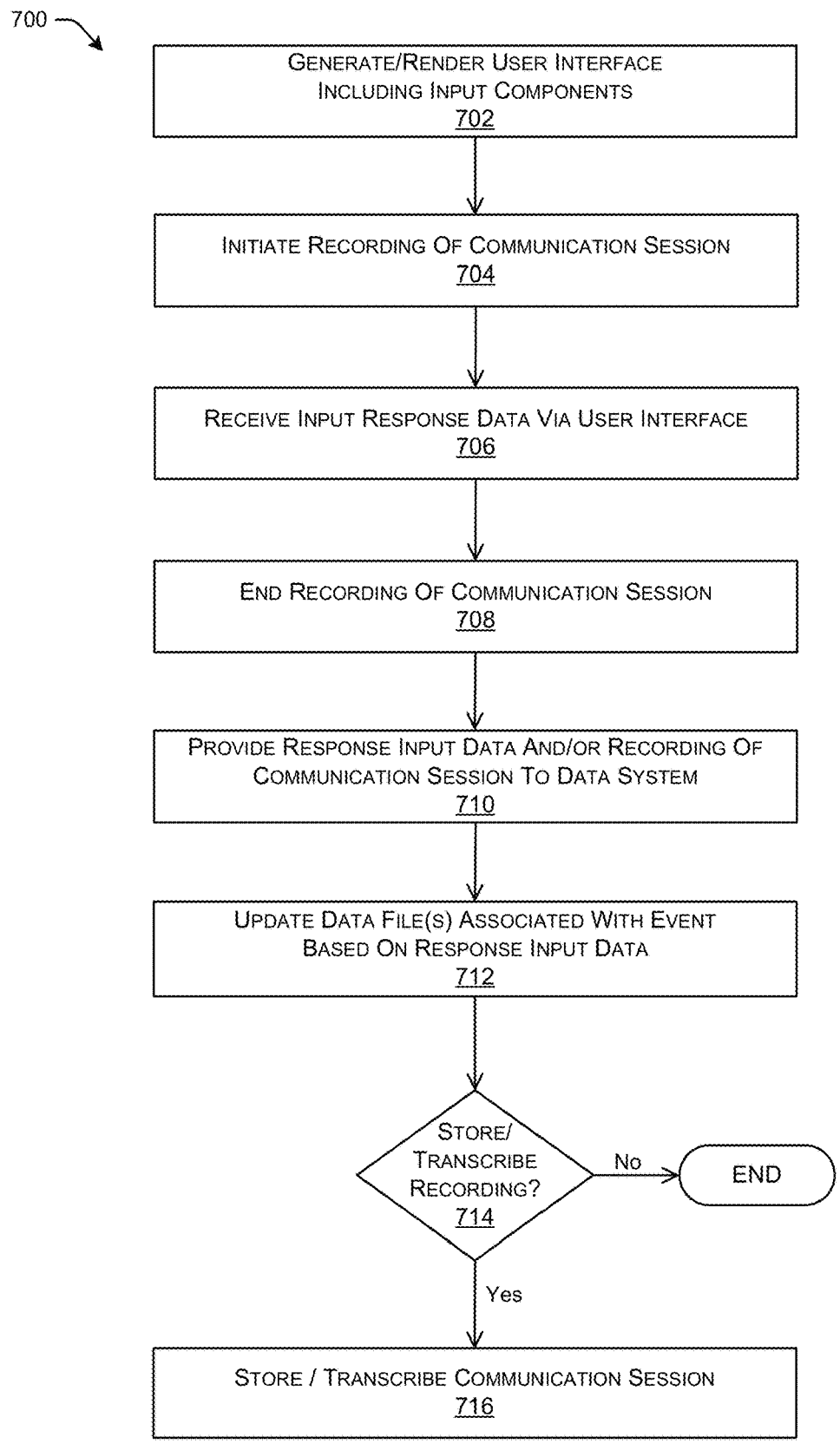
FIG. 7 illustrates an example process of receiving and processing user input via a customized user interface associated with user communication session, in accordance with one or more examples of the present disclosure.

FIG. 7 is a flow diagram illustrating a process 700 for receiving and processing input from an associate and/or a user, via a customized user interface. As described above in reference to FIGS. 2 and 5, the data system 102 may generate and render customized user interfaces based on the data deficiencies (e.g., missing data, inconsistent data, and/or unverified data) associated with a particular user. The customized user interfaces may be rendered on a client device 104 of an associate, to allow the associate to resolve the data deficiencies during a call (or other communication session) with the user. In some examples, the associate may capture a recorded statement of the user during a call (or other communication session) with the user. The customized user interface may allow the associate to perform the recorded statement, may provide prompts and questions for the associate to use during the recorded statement, and response components to allow the associate to input data based on the user's responses during the recorded statement. Process 700 relates to executing the customized user interfaces, and receiving/processing the responses and other inputs received via the user interfaces, including responses input by the associate and/or the audio/video of recorded statements made by the user.

At operation 702, the data system 102 generates and/or renders (e.g., causes an electronic device or display to render) a customized user interface that includes input components based on the data deficiencies associated with a user. Operation 702 may be similar or identical to operations 210 and/or 514 described above in reference to FIGS. 2 and 5. As discussed above, the customized user interface may be rendered on a client device 104 of an associate, during or in preparation for a communication session (e.g., call, video, web chat, etc.) with a user. The customized user interface may include prompts for the associate, questions for the user, and various UI controls to allow the associate to input data based on the user's responses during the communication session. The user interface generation component 114 also may generate and/or customize the user interface based on the user, the associate, and/or other factors related to the event or the collection of data associated with the event (e.g., names, locations, times/dates, states of the event or data, etc.). The customized user interface may be provided to the client device 104 of the associate, and rendered via a web-browser or client application, and may be integrated into automated contact center software of the organization.

At operation 704, after connecting with the user device 106 and establishing the communication session, the user interface executing on the client 104 may initiate recording of the communication session. In some cases, the user interface may include text or a notification to prompt the associate to begin capturing the user's recorded statement. A recorded statement may be an audio and/or video recording that captures a selected portion of the communication session between the associate and user. In some cases, associate may initiate (or receive) communication sessions with the user, introduce themselves and ask some preliminary questions to determine whether or not to proceed with a recorded statement. When the associate determines that a recorded statement should be captured for the user, the associate may initiate the recording via a software control embedded in the user interface (e.g., begin recording button 402) that activates an audio/video recording feature for the communication session, or using separate recording functionality.

At operation 706, the user interface may receive response data input by the associate during the communication session between the associate and the user. In some example, the user interface may be customized to receive response data that may input by the associate (or directly by the user), before, during, and after capturing the user's recorded statement. The user interface may include associate prompts and/or questions for the associate to ask the user, along with a text box, multiple choice buttons, and/or other user interface controls to allow the associate to input the user's responses. During the communication session, the associate may refer to a question/prompt in the user interface to request information from the user, input response data into the appropriate filed of the user interface based on the user's response, and then proceed to the next question. In some examples, the customized user interface may be dynamic in that the questions/prompts for the associates and/or the response input options may be based on the user's answers to previous questions. For instance, the input to one question may lead to triggering a dynamic question to obtain additional data that can be relied upon as part of the investigation process to make a quality claim decision.

Additionally, in some cases the UI components in the user interface to receive the response input from the associate may be customized based on the particular data associated with the event. As an example, if the user interface prompts the associate to a question related to car accident for an insurance claim, the response input components in the user interface may be populated with data from the insurance claim file. For instance, the associate may be prompted to ask the user which car hit the user's car first during the accident, and the user interface may provide selectable buttons or a drop-down listing with options that include each of the vehicles involved in the accident. As another example, the associate may be prompted to ask the user which other users he/she spoke to on the day of the accident, and the user interface may be customized to include a clickable box or button listing the name of each of the other people involved in the accident. These techniques thus save screen space within user interfaces, and provide more accuracy and efficient interactions with users, by generating response input components based on the event-related data.

At operation 708, the associate ends the recording of the communication session with the user, and/or the communication session itself. As noted above, the user interface may include text or a notification to prompt the associate to end the recorded statement with the user. For instance, the user interface may include an embedded software control (e.g., end recording button 410) that deactivates the audio/video recording feature for the communication session, or a prompt to cause the associate to manually end the recording. In some cases, the user interface also may include components and controls that are selectable by the associate, to allow the associate to terminal the communication session with the user and/or to save/upload the user's recorded statement and the responses input via the user interface.

At operation 710, the response input data and/or the user's recorded statement may be provided to the data system 102 for analysis and processing of the response input data received during the communication session. In some examples, the user interface executing on the client device 104 of the associate may be configured to automatically transmit the response data input by the associate and/or the user's recorded statement, to the data system 102 for analysis and processing by the user interface response analysis component 116. The user interface may be configured to transmit responses received via the user interface, and the audio/video files of the user's recorded statement, either at the end of the communication session or at one or more times during the communication session (e.g., after a response input by the associate, after capturing the recorded statement, etc.).

At operation 712, the user interface response analysis component 116 updates the data associated with the event, based on the response input data received via the user interface. As noted above, the response input data may be data input to the user interface by the associate during the communication session, based on the user's responses to questions asked by the associate. The response input data can include data typed into text boxes by the associate and/or user interface controls selected by the associate that reflect the answers provided by the user during the call. In some examples, in operation 712 the user interface response analysis component 116 may automatically extract, convert, and store the response data input from the associate into the data store(s) 118 for the event. For a particular response input by the associate, the user interface response analysis component 116 may determine the associated storage location for that response within the data store(s) 118, based on which question in the user interface prompted the response. The user interface response analysis component 116 then may extract the response data, convert the response data to a format compatible with the data field, database or file in the data store(s) 118, and store or overwrite the data as needed. In the examples described herein, by using the user interface response analysis component 116 to automate the data extraction, converting/formatting, and data storage, the data system 102 may reduce or eliminate conventional manual processes for data capture and entry, and may provide higher quality data in a more efficient manner.

At operation 714, the user interface response analysis component 116 may use the response input data received from the user interface to determine the processing operations for the user's recorded statement. For example, the processing operations may include storing the user's recorded statement and/or initiating a transcription of the user's recorded statement. Alternatively, based on the response input data received via the user interface, the user interface response analysis component 116 may discard the recorded statement.

In some examples, the determinations for processing the user's recorded statement may be based on input from the associate provided via the user interface. For instance, after ending the recorded statement and/or terminating the communication, the user interface may include options for the associate to store the recorded statement, transcribe the recorded statement, discard the recorded statement, schedule a follow-up communication, etc. Additionally or alternatively, the determinations for processing the user's recorded statement may performed by the user interface response analysis component 116, based on analyzing the response input data from the associate reflecting the user's answers during the call. Depending on which questions the user answered during the recorded statement, what answers were given and/or what data was provided, the user interface response analysis component 116 may decide to store or discard the recorded statement and/or whether or not to transcribe the recorded statement. For instance, if response data from the associate indicates that the user did not recall or did not provide responsive answers to the questions, then the user interface response analysis component 116 may determine that the recorded statement is not to be stored or transcribed. However, if response data from the associate indicates that the user provided full and responsive answers to the questions, a good account of an incident, etc., then the user interface response analysis component 116 may determine that the recorded statement will be stored and/or transcribed.

Additionally, the user interface response analysis component 116 may evaluate specific user answers within the recorded statement, based on response data input by the associate during the call. For instance, if the user interface response analysis component 116 determines that a particular answer in the user's recorded statement is likely to differ from an account in another user's statement, then the user interface response analysis component 116 may determine that the recorded statement should be both stored and transcribed to preserve the differing accounts. In some examples, the user interface response analysis component 116 may determine not only whether to store and/or transcribe a recorded statement, but also may determine levels of security or accuracy for the storage and transcription. For instance, based on the response input data and/or additional user data, associate data, or event data, the user interface response analysis component 116 may determine whether a recorded statement should be stored locally by the data system 102 or externally in a secure cloud-based storage repository (e.g., media recording storage system 120). As another example, the user interface response analysis component 116 may determine whether a recorded statement should be transcribed using a quicker and less expensive software-based automated transcription service, or a slower but more accurate manual transcription service.

When the user interface response analysis component 116 determines in operation 714 that the user's recorded statement is to be stored and/or transcribed (714:Yes), then in operation 716 the data system 102 initiates the storing and/or transcription of the recorded statement in accordance with the processing determinations for the recorded statement. When a recorded statement is to be stored, the user interface response analysis component 116 may store the recorded statement locally on the data system 102, in the communication session data store 124, and/or via an external media recording storage system 120. Additionally, when a recorded statement is to be transcribed, the user interface response analysis component 116 may initiate the transcription via one or more internal or external transcription services 122, which may be automated or manual.

As noted above, the user interface response analysis component 116 also may associate specific storage locations for data files, fields, etc. of event-related data in the data store(s) 118, with the locations and timestamps of the associated recorded statement in the media recording storage system 120, and/or the associated transcripts of the recorded statement. The user interface response analysis component 116 may store these associations as metadata for the data fields and other storage locations in the data store(s) 118. As an example, a piece of data within the event data (e.g., a claim summary) indicating whether or not a user was injured during an accident may be a Yes/No data field, but also may have associated metadata indicating the storage location and timestamp of the recorded statement, and/or the path and line number of a transcribe file, where the user indicated whether or not the user sustained an injury.

As described in these examples, techniques illustrated in FIG. 7 provide additional advantages in data systems, by determining post-processing of communication sessions with users, based on the data received from the associate via the customized user interface. For instance, a recorded statement or other user communication session may or may not be stored, transcribed, and/or associated with other event-related data, based on input response data from an associate during the user communication session via the customized user interface.

Further, in some examples, the data system 102 can utilize the data received via the user interface during the communication session, to identify trends and potential next best action determinations. For instance, based on the input received during communication sessions, the data system 102 may correlate the current data system (e.g., insurance claim) to a trend, or determine a next best action for the associate during the interactive communication session or a next best action for a claim processing pipeline. Next best actions may include any steps that can lead to quality and efficient claim handling, including initiating operations to retrieve additional information from the user or other users associated with the same claims, or performing determinations such as liability, damage amount, claim type.

FIGS. 8A-8D depict example user interface screens of a customized user interface generated using various techniques described herein. As shown in this example, user interface screens 800-806 may be part of user interface generated by the data system 102 for use by an associate, to guide the associate through an interview with a user related to an accident and/or insurance claim. The customized user interface in this example includes questions to be asked by the associate and input components constructed to receive responses from the associate based on the user's answers. As described above, the questions within the user interface screens 800-806 may be selected by the data system 102 using the techniques described herein, to resolve data deficiencies associated with the specific user. User interface screens 800-806 may be specifically selected for inclusion in a recorded statement in some cases, and thus may appear between screens similar or identical to user interface screens 400 and 408 described above. During the recorded statement, the questions asked by the associate and the user's answers may be recorded as audio and/or video content, and the associate also may input response data into the interface screens 800-806 to reflect the user's responses and/or other notes made by the associate during the communication session.

Figure 9:
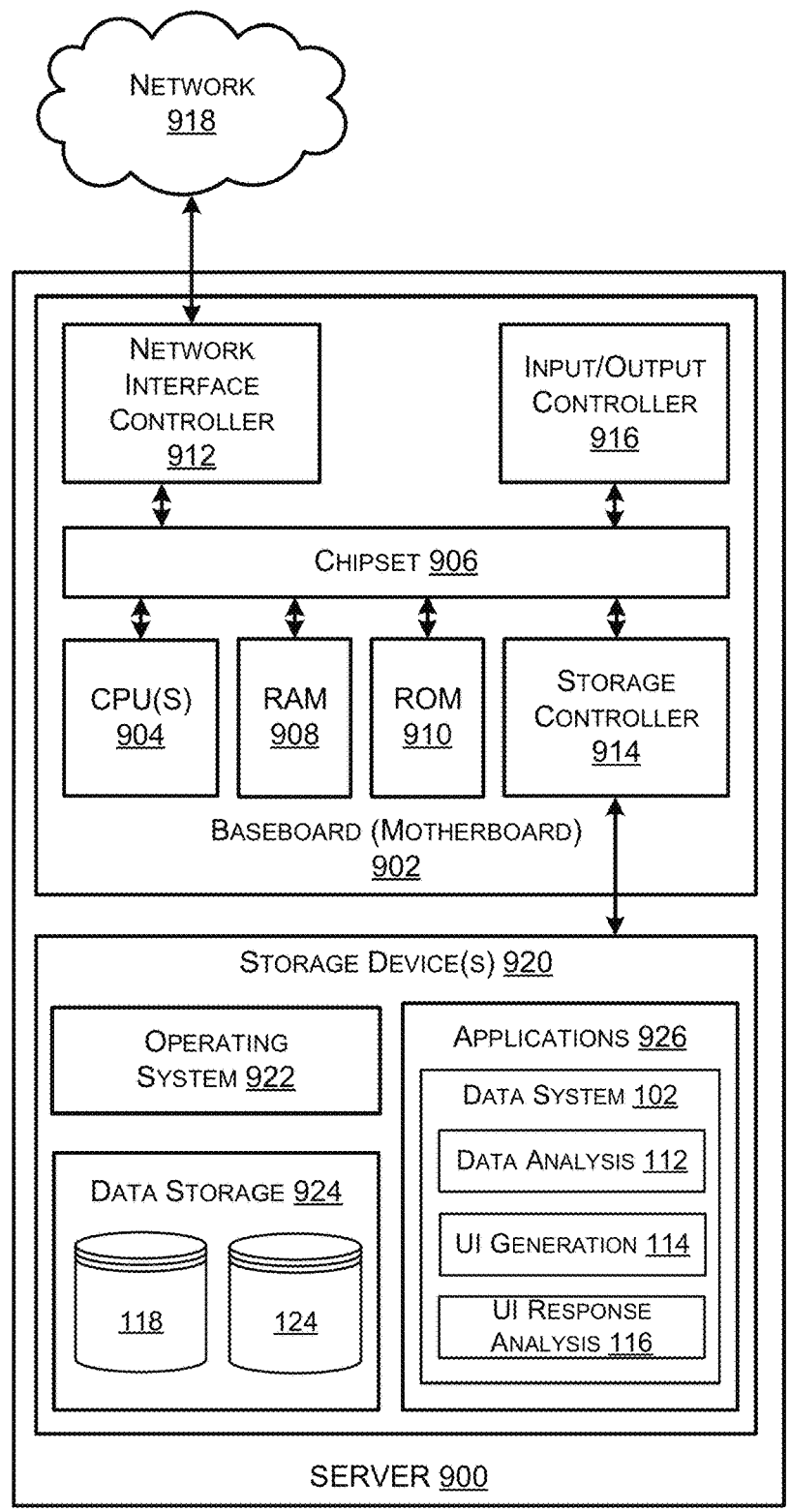
FIG. 9 is an example architecture of a computer server capable of executing program components for implementing various techniques described herein.

FIG. 9 shows an example architecture of a computer server 900 capable of executing program components for implementing the various functionality described herein. Although the computer architecture in this example is labeled as a server, it can be understood from this disclosure that similar or identical computer architectures may be implemented via workstations, desktop or laptop computers, tablet computers, network appliances, mobile devices (e.g., smartphones, etc.) or other computing device, and/or virtual machines or cloud-based computing solutions, any or all of which may execute any combination of the software components described herein. The server 900 may, in some examples, correspond to any of the computing systems or devices described above, such as a data system 102 including a data analysis component 112, a user interface generation component 114, and/or a user interface response analysis component 116. In other examples, the data system 102 may include additional or alternative components, such as the media recording storage system 120, the transcription service 122, and/or any other computing devices, systems, or components executing the software components described herein. It will be appreciated that in various examples described herein, a server 900 might not include all of the components shown in FIG. 9, may include additional components that are not explicitly shown in FIG. 9, and/or may utilize a different architecture from that shown in FIG. 9.

The server 900 includes a baseboard 902, or "motherboard," which may be a printed circuit board to which a multitude of components or devices are connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the server 900.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the server 900. The chipset 906 can further provide an interface to a computer-readable storage medium such as a ROM 910 or non-volatile RAM ("NVRAM") for storing basic routines that help to startup the server 900 and to transfer information between the various components and devices. The ROM 910 or NVRAM can also store other software components necessary for the operation of the server 900 in accordance with the configurations described herein.

The server 900 can operate in a networked environment using logical connections to remote computing devices and computer systems through a network, such as the network 918, which may be similar or identical to any of the communication networks discussed above. The chipset 906 also may include functionality for providing network connectivity through a Network Interface Controller (NIC) 912, such as a gigabit Ethernet adapter. The NIC 912 is capable of connecting the server 900 to other computing devices (e.g., client or user devices, data stores, external systems or services, etc.) over the network 918. It should be appreciated that multiple NICs 912 can be present in the server 900, connecting the computer to other types of networks and remote computer systems. In some instances, the NICs 912 may include at least on ingress port and/or at least one egress port.

The server 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device.

The server 900 can include one or more storage device(s) 920, which may be connected to and/or integrated within the server 900, that provide non-volatile storage for the server 900. The storage device(s) 920 can store an operating system 922, data storage systems 924, and/or applications 926, which may include any combination of the systems and/or components described herein. The storage device(s) 920 can be connected to the server 900 through a storage controller 914 connected to the chipset 906. The storage device(s) 920 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The server 900 can store data on the storage device(s) 920 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device(s) 920 are characterized as primary or secondary storage, and the like.

For example, the server 900 can store information to the storage device(s) 920 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The server 900 can further read information from the storage device(s) 920 by detecting the physical states or characteristics of one or more particular locations within the physical storage units.

In addition to the storage device(s) 920 described above, the server 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the server 900. In some examples, the various operations performed by the computing systems described herein (e.g., data system 102, media recording storage system 120, transcription service 122, etc.) may be implemented within a datacenter including one or more servers or devices similar to server 900. For instance, some or all of the operations described herein may be performed by one or more server 900 operating in a networked (e.g., client-server or cloud-based) arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device(s) 920 can store an operating system 922 utilized to control the operation of the server 900. In some examples, the operating system 922 comprises a LINUX operating system. In other examples, the operating system 922 comprises a WINDOWS® SERVER operating system from MICROSOFT Corporation of Redmond, Washington In further examples, the operating system 922 can comprise a UNIX operating system or one of its variants. It should be appreciated that other operating systems can also be utilized. The storage device(s) 920 can store other system or application programs and data utilized by the server 900.

In various examples, the storage device(s) 920 or other computer-readable storage media is encoded with computer-executable instructions which, when loaded into the server 900, transform the computer from a general-purpose computing system into a special-purpose computer capable of implementing various techniques described herein. These computer-executable instructions transform the server 900 by specifying how the CPUs 904 transition between states, as described above. In some examples, the server 900 may have access to computer-readable storage media storing computer-executable instructions which, when executed by the server 900, perform the various techniques described herein. The server 900 can also include computer-readable storage media having instructions stored thereupon for performing any of the other computer-implemented operations described herein.

As illustrated in FIG. 9, the storage device(s) 920 may store one or more data storage systems 924 configured to store data structures and other data objects. In some examples, data storage systems 924 may include one or more data stores, which may be similar or identical to the data store(s) 118 and/or the communication session data store 124, described above. Additionally, the software applications 926 stored on the server 900 may include one or more applications, services, and/or other software components. For example, application(s) 926 may include any combination of the components 112-116 and/or 120-122 discussed above in relation to the data system 102, and/or any other software components described herein.

As illustrated by the above examples, the techniques described herein provide various technical advantages that improve various data systems, including but not limited to insurance claim processing systems, project/research management systems, and the like. Specifically, the techniques described herein provide improved detection of the data deficiencies in a data system that are associated with and can be resolved by specific users. These techniques also provide improved user interfaces, including generating customized user interfaces to resolve the data deficiencies detected for a specific user, including customizations based on the user, associate, locations, claim states, etc. Additionally, the techniques described herein provide improvements in generating and managing recorded communication sessions (e.g., recorded audio/video statements), including rules-based or model-based techniques to analyze the input response data to determine when and how a recorded statement is to be stored, transcribed, and/or associated with other relevant data within the data system. Thus, these techniques improve processing efficiency, reduce delays and resource costs for storing and transcribing the media content of communication sessions, but selectively excluding sessions that cannot or do not resolve the detected data deficiencies.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on."

As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A computer-implemented method, comprising:
   receiving, by a computer system, event data associated with an event;
   determining, by the computer system, one or more deficiencies in the event data associated with a first user, wherein the one or more deficiencies correspond to a first subset of the event data associated with the first user, wherein a second subset of the event data includes non-deficient event data associated with the first user;
   generating, by the computer system, a customized user interface operable to capture recorded data related to the event, wherein generating the customized user interface includes generating one or more input prompts configured to capture data responsive to the one or more deficiencies in the event data associated with the first user, and wherein the customized user interface excludes input prompts configured to capture the second subset of event data;
   providing, by the computer system and via a network, the customized user interface to a client device;
   receiving, by the computer system and via the network, input data entered into the one or more input prompts of the customized user interface; and
   updating, by the computer system, the event data based at least in part on the input data.

2. The computer-implemented method of claim 1, wherein generating the customized user interface comprises:
   determining a plurality of users associated with the event;
   generating a first user interface component having a selection component, the selection component including a respective selectable portion corresponding to each user of the plurality of users;
   receiving a first selection of the first user via the selection component; and
   generating the one or more input prompts within the customized user interface, based at least in part on the first selection of the first user.

3. The computer-implemented method of claim 2, further comprising:
   receiving a second selection of a second user via the selection component; and
   generating a second set of input prompts within the customized user interface, based at least in part on the second selection of the second user, wherein the second set of input prompts is different from the one or more input prompts.

4. A computer system, comprising:
   one or more processors; and
   one or more non-transitory computer-readable media storing computer-executable instructions that, when executed by the one or more processors, cause the one or more processors to perform operations comprising:
   receiving event data associated with an event;
   determining one or more deficiencies in the event data associated with a first user, wherein the one or more deficiencies correspond to a first subset of the event data associated with the first user, wherein a second subset of the event data includes non-deficient event data associated with the first user;
   generating a customized user interface operable to capture recorded data related to the event, wherein generating the customized user interface includes generating one or more input prompts configured to capture data responsive to the one or more deficiencies in the event data associated with the first user, and wherein the customized user interface excludes input prompts configured to capture the second subset of event data;
   providing, via a network, the customized user interface to a client device;
   receiving, via the network, input data entered into the one or more input prompts of the customized user interface; and
   updating the event data based at least in part on the input data.

5. The computer system of claim 4, the operations further comprising:
   determining a second user associated with the client device, wherein generating the one or more input prompts is further based on the second user.

6. The computer system of claim 4, wherein determining the one or more deficiencies in the event data comprises:
   determining an inconsistency within the event data between first data associated with the first user, and second data associated with a second user.

7. A computer-implemented method, comprising:
   receiving, by a computer system, event data associated with an event;
   determining, by the computer system, one or more deficiencies in the event data associated with a first user, wherein the one or more deficiencies correspond to a first subset of the event data associated with the first user;
   generating, by the computer system, a customized user interface operable to capture recorded data related to the event, wherein generating the customized user interface includes:
      rendering a first control on the customized user interface to initiate capturing the recorded data;
      rendering a second control on the customized user interface to stop capturing the recorded data; and
      generating, between the first control and the second control on the customized user interface, one or more input prompts configured to capture data responsive to the one or more deficiencies in the event data associated with the first user;
   providing, by the computer system and via a network, the customized user interface to a client device;
   receiving, by the computer system and via the network, input data entered into the one or more input prompts of the customized user interface; and
   updating, by the computer system, the event data based at least in part on the input data.

8. The computer-implemented method of claim 7, wherein generating the customized user interface comprises:
   determining a plurality of users associated with the event;
   generating a first user interface component having a selection component, the selection component including a respective selectable portion corresponding to each user of the plurality of users;
   receiving a first selection of the first user via the selection component; and
   generating the one or more input prompts within the customized user interface, based at least in part on the first selection of the first user.

9. The computer-implemented method of claim 8, further comprising:
   receiving a second selection of a second user via the selection component; and
   generating a second set of input prompts within the customized user interface, based at least in part on the second selection of the second user, wherein the second set of input prompts is different from the one or more input prompts.

10. The computer-implemented method of claim 7, wherein determining the one or more deficiencies in the event data comprises:
   determining an inconsistency within the event data between first data associated with the first user, and second data associated with a second user.

11. A computer system, comprising:
   one or more processors; and
   one or more non-transitory computer-readable media storing computer-executable instructions that, when executed by the one or more processors, cause the one or more processors to perform operations comprising:
      receiving event data associated with an event;
      determining one or more deficiencies in the event data associated with a first user, wherein the one or more deficiencies correspond to a first subset of the event data associated with the first user;
      generating a customized user interface operable to capture recorded data related to the event, wherein generating the customized user interface includes:
         rendering a first control on the customized user interface to initiate capturing the recorded data;
         rendering a second control on the customized user interface to stop capturing the recorded data; and
         generating, between the first control and the second control on the customized user interface, one or more input prompts configured to capture data responsive to the one or more deficiencies in the event data associated with the first user;
      providing, via a network, the customized user interface to a client device;
      receiving, via the network, input data entered into the one or more input prompts of the customized user interface; and
      updating the event data based at least in part on the input data.

12. The computer system of claim 11, wherein generating the one or more input prompts comprises:
   determining a first question, based at least in part on the first user and the one or more deficiencies in the event data;
   rendering first text on the customized user interface associated with the first question;
   determining a plurality of possible responses to the first question, based at least in part on the event data; and
   rendering a first user interface component on the customized user interface, wherein the first user interface component is configured to receive a selection of one of the plurality of possible responses.

13. The computer system of claim 11, the operations further comprising:
   causing a transcription of the recorded data to be generated.

14. A computer-implemented method, comprising:
   receiving, by a computer system, event data associated with an event, and second event data associated with second event different from the event;
   determining, by the computer system, one or more deficiencies in the event data associated with a first user, wherein the one or more deficiencies correspond to a first subset of the event data associated with the first user;
   determining one or more additional deficiencies in the second event data associated with the first user;
   generating, by the computer system, a customized user interface operable to capture recorded data related to the event, wherein generating the customized user interface includes generating one or more input prompts configured to capture data responsive to the one or more deficiencies in the event data associated with the first user, and generating one or more additional input prompts based on the one or more additional deficiencies in the second event data;
   providing, by the computer system and via a network, the customized user interface to a client device;
   receiving, by the computer system and via the network, input data entered into the one or more input prompts of the customized user interface; and
   updating, by the computer system, the event data based at least in part on the input data.

15. The computer-implemented method of claim 14, wherein generating the customized user interface comprises:
- determining a plurality of users associated with the event;
- generating a first user interface component having a selection component, the selection component including a respective selectable portion corresponding to each user of the plurality of users;
- receiving a first selection of the first user via the selection component; and
- generating the one or more input prompts within the customized user interface, based at least in part on the first selection of the first user.

16. The computer-implemented method of claim 15, further comprising:
- receiving a second selection of a second user via the selection component; and
- generating a second set of input prompts within the customized user interface, based at least in part on the second selection of the second user, wherein the second set of input prompts is different from the one or more input prompts.

17. The computer-implemented method of claim 14, wherein updating the event data comprises updating a first data field within a first file associated with the event based on the input data, and wherein the method further comprises:
- storing an audio recording associated with the recorded data, at a first storage location; and
- storing an association between the first storage location and the first data field within the first file.

18. A computer system, comprising:
- one or more processors; and
- one or more non-transitory computer-readable media storing computer-executable instructions that, when executed by the one or more processors, cause the one or more processors to perform operations comprising:
  - receiving event data associated with an event, and second event data associated with second event different from the event;
  - determining one or more deficiencies in the event data associated with a first user, wherein the one or more deficiencies correspond to a first subset of the event data associated with the first user;
  - determining one or more additional deficiencies in the second event data associated with the first user;
  - generating a customized user interface operable to capture recorded data related to the event, wherein generating the customized user interface includes generating one or more input prompts configured to capture data responsive to the one or more deficiencies in the event data associated with the first user, and generating one or more additional input prompts based on the one or more additional deficiencies in the second event data;
  - providing, via a network, the customized user interface to a client device;
  - receiving, via the network, input data entered into the one or more input prompts of the customized user interface; and
  - updating the event data based at least in part on the input data.

19. The computer system of claim 18, wherein generating the one or more input prompts comprises:
- determining a first question, based at least in part on the first user and the one or more deficiencies in the event data;
- rendering first text on the customized user interface associated with the first question;
- determining a plurality of possible responses to the first question, based at least in part on the event data; and
- rendering a first user interface component on the customized user interface, wherein the first user interface component is configured to receive a selection of one of the plurality of possible responses.

20. The computer system of claim 18, the operations further comprising:
- causing a transcription of the recorded data to be generated.

* * * * *